US011913617B2

(12) United States Patent
Tsuzuki et al.

(10) Patent No.: US 11,913,617 B2
(45) Date of Patent: Feb. 27, 2024

(54) INTERIOR COMPONENT FOR VEHICULAR LAMP

(71) Applicant: IDEMITSU KOSAN CO., LTD., Tokyo (JP)

(72) Inventors: Junichi Tsuzuki, Sodegaura (JP); Toshio Isozaki, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 18/009,908

(22) PCT Filed: Apr. 6, 2021

(86) PCT No.: PCT/JP2021/014608

§ 371 (c)(1),
(2) Date: Dec. 12, 2022

(87) PCT Pub. No.: WO2021/256057

PCT Pub. Date: Dec. 23, 2021

(65) Prior Publication Data

US 2023/0265983 A1 Aug. 24, 2023

(30) Foreign Application Priority Data

Jun. 16, 2020 (JP) ................................ 2020-103993

(51) Int. Cl.

| | |
|---|---|
| ***F21S 41/00*** | (2018.01) |
| ***F21S 41/24*** | (2018.01) |
| ***F21S 41/25*** | (2018.01) |
| ***F21S 43/235*** | (2018.01) |
| ***F21S 43/20*** | (2018.01) |

(52) U.S. Cl.

CPC ............... *F21S 41/24* (2018.01); *F21S 41/25* (2018.01); *F21S 43/235* (2018.01); *F21S 43/26* (2018.01)

(58) Field of Classification Search

CPC .......... F21S 43/235; F21S 43/26; F21S 41/24; F21S 41/25

See application file for complete search history.

(56) References Cited

U.S. PATENT DOCUMENTS

| | | | | |
|---|---|---|---|---|
| 2015/0185404 | A1* | 7/2015 | Chi | G02B 6/0065 528/196 |
| 2019/0194537 | A1* | 6/2019 | Sekiguchi | C08K 5/55 |
| 2019/0381762 | A1* | 12/2019 | Yamamoto | C08L 33/14 |
| 2020/0024445 | A1* | 1/2020 | Isozaki | C08K 5/1515 |
| 2020/0064528 | A1* | 2/2020 | Uto | G02B 6/0056 |
| 2020/0200945 | A1* | 6/2020 | Totani | C08K 5/5333 |
| 2021/0381672 | A1* | 12/2021 | Koizumi | F21S 43/26 |
| 2022/0065416 | A1* | 3/2022 | Qiu | F21S 41/147 |
| 2022/0120401 | A1* | 4/2022 | Zhang | B60Q 1/0408 |
| 2022/0161523 | A1* | 5/2022 | Oota | B32B 17/10651 |

FOREIGN PATENT DOCUMENTS

| | | | |
|---|---|---|---|
| JP | 2014-112630 | A | 6/2014 |
| JP | 5672062 | B2 | 2/2015 |
| JP | 2016-091825 | A | 5/2016 |
| JP | 2016-219403 | A | 12/2016 |
| WO | WO-2014/020848 | A1 | 2/2014 |
| WO | WO-2016/060220 | A1 | 4/2016 |
| WO | WO-2018/155501 | A1 | 8/2018 |

OTHER PUBLICATIONS

International Searching Authority, "International Search Report," issued in connection with International Patent Application No. PCT/JP2021/014608, dated Jun. 15, 2021.
International Searching Authority, "Written Opinion," issued in connection with International Patent Application No. PCT/JP2021/014608, dated Jun. 15, 2021.

* cited by examiner

*Primary Examiner* — Gerald J Sufleta, II
(74) *Attorney, Agent, or Firm* — Foley & Lardner LLP

(57) ABSTRACT

An internal part for a lighting tool for a vehicle, including: an entering portion for light; an emitting portion for light; and a light-guiding portion to guide the light from the entering portion to the emitting portion, the part being arranged at a distance of 5 mm or less from a light source, wherein the part is a molded body formed of a resin composition, wherein a 5-millimeter thick plate, obtained by subjecting the resin composition to injection molding at a cylinder temperature of 260° C., a die temperature of 80° C., a cycle time of 50 seconds, and a retention time of 230 seconds, a total light transmittance of 80% or more, and a ratio (X/Y) of a spectral light transmittance (X) of the 5-millimeter thick plate at a wavelength of 350 nm to a spectral light transmittance (Y) thereof at a wavelength of 400 nm is 0.75 or more.

15 Claims, No Drawings

INTERIOR COMPONENT FOR VEHICULAR LAMP

CROSS-REFERENCE TO RELATED APPLICATIONS

The present application claims priority under 37 U.S.C. § 371 to International Patent Application No. PCT/JP2021/014608, filed Apr. 6, 2021, which claims priority to and the benefit of Japanese Patent Application No. 2020-103993, filed on Jun. 16, 2020. The contents of these applications are hereby incorporated by reference in their entireties.

TECHNICAL FIELD

The present invention relates to an internal part for a lighting tool for a vehicle, and more specifically, to a resin-made internal part for a lighting tool for a vehicle.

BACKGROUND ART

A lighting tool for a vehicle, which is obtained by combining a light-emitting element such as an LED and a light-guiding body for controlling light from the light-emitting element, has heretofore been proposed. For example, daytime running lights or daytime running lamps (hereinafter also referred to as "DRLs") each serving as one kind of lighting tool for a vehicle are each used as a part for introducing high-output LED light into its entirety and extracting the light in a specific direction in order to improve the visibility of a vehicle. In such lighting tool for a vehicle, the light from the light-emitting element is caused to enter the inside of the light-guiding body from an entering portion arranged on the surface of the light-guiding body. The entered light can be extracted from the emitting portion of a structure shaped on the surface of an internal part for the lighting tool for a vehicle. In each of, for example, PTLs 1 to 4, there is a disclosure of a resin-made internal part for such lighting tool for a vehicle.

In PTL 1, there is a disclosure of a lighting tool that can achieve luminous flux utilization efficiency equal to or higher than a conventional one even when the width dimension of its lens body is shortened. In PTL 2, there is a disclosure of a lighting tool for a vehicle, which includes a light-emitting element and a plate-like light-guiding body arranged so as to be substantially perpendicular to the optical axis of the light-emitting element, and is hence improved in uniformity of the brightness of emitted light. In PTL 3, there are disclosures of a resin-made optical member showing an innovative design property and a lighting tool for a vehicle using the member. In PTL 4, there is a disclosure of an inner lens, which is sufficiently suppressed from causing a vacuum void and a sink mark, and hence can exhibit practically sufficient optical characteristics, and which has sufficient strength and sufficient heat resistance even at a site for its fixation together with any other part.

CITATION LIST

Patent Literature

PTL 1: JP 5672062 B2
PTL 2: JP 2016-091825 A
PTL 3: WO 2014/020848 A1
PTL 4: JP 2016-219403 A

SUMMARY OF INVENTION

Technical Problem

In recent years, an internal part for such lighting tool for a vehicle such as a DRL has been an elongated shape from the viewpoint of a design property, and hence a problem in that the color tone of light, which has entered from a light source and has been guided in the internal part, changes at an end portion of the internal part has started to become apparent.

However, in each of the technologies disclosed in PTLs described above, a problem concerning making a part itself for a lighting tool for a vehicle excellent in initial color tone of guided light to reduce a change in color tone thereof in a long light-guiding path along with the elongation of the part has not been recognized. Accordingly, the development of a resin molded body excellent in light-guiding performance, the resin molded body being useful as an internal part for a lighting tool for a vehicle, has been required.

An object to be achieved by the present invention is to provide a resin-made internal part for a lighting tool for a vehicle, which itself is excellent in initial color tone of guided light and which is suppressed from showing a change in color tone thereof in a long light-guiding path. Another object of the present invention is to provide a resin-made internal part for a lighting tool for a vehicle, which is suppressed from showing a change in color tone of guided light in a long light-guiding path even under a high-temperature environment.

Solution to Problem

The present invention relates to the following.

<1> An internal part for a lighting tool for a vehicle, comprising:

an entering portion from which light enters;

an emitting portion from which the entered light is emitted; and a light-guiding portion configured to guide the light that has entered from the entering portion to the emitting portion, the part being arranged at a distance of 5 mm or less from a light source, wherein the part is a molded body formed of a resin composition, wherein a 5-millimeter thick plate, which is obtained by subjecting the resin composition to injection molding under conditions of a cylinder temperature of 260° C., a die temperature of 80° C., a cycle time of 50 seconds, and a retention time of 230 seconds, has a total light transmittance of 80% or more, and wherein a ratio (X/Y) of a spectral light transmittance (X) of the 5-millimeter thick plate at a wavelength of 350 nm to a spectral light transmittance (Y) thereof at a wavelength of 400 nm is 0.75 or more.

<2> The internal part for a lighting tool for a vehicle according to the above-mentioned item <1>, wherein a resin in the resin composition has a viscosity-average molecular weight of 10,000 or more and 30,000 or less.

<3> The internal part for a lighting tool for a vehicle according to the above-mentioned item <1> or <2>, wherein a light-guiding path length from the entering portion to the emitting portion is 100 mm or more.

<4> The internal part for a lighting tool for a vehicle according to any one of the above-mentioned items <1> to <3>, wherein the lighting tool for a vehicle is at least one selected from the group consisting of: a front lamp for a vehicle; a back lamp for a vehicle; a communication lamp for a vehicle exterior; and a light for a vehicle interior (ambient lamp).

<5> The internal part for a lighting tool for a vehicle according to any one of the above-mentioned items <1> to <4>, wherein a surface of the light-guiding portion has an arithmetic average roughness Sa of 3 μm or less.

<6> The internal part for a lighting tool for a vehicle according to any one of the above-mentioned items <1> to <5>, wherein the 5-millimeter thick plate obtained by subjecting the resin composition to injection molding has a YI of 1.5 or less.

<7> The internal part for a lighting tool for a vehicle according to any one of the above-mentioned items <1> to <6>, wherein the spectral light transmittance (X) of the 5-millimeter thick plate obtained by subjecting the resin composition to injection molding at a wavelength of 350 nm is 70% or more.

<8> The internal part for a lighting tool for a vehicle according to any one of the above-mentioned items <1> to <7>, wherein a spectral light transmittance (Z) of the 5-millimeter thick plate obtained by subjecting the resin composition to injection molding at a wavelength of 300 nm is 15% or more.

<9> The internal part for a lighting tool for a vehicle according to the above-mentioned item <8>, wherein a ratio (Z/Y) of the spectral light transmittance (Z) of the 5-millimeter thick plate obtained by subjecting the resin composition to injection molding at a wavelength of 300 nm to the spectral light transmittance (Y) thereof at a wavelength of 400 nm is 0.20 or more.

<10> The internal part for a lighting tool for a vehicle according to the above-mentioned item <9>, wherein the spectral light transmittance (Y) of the 5-millimeter thick plate obtained by subjecting the resin composition to injection molding at a wavelength of 400 nm is 85% or more, and a sum of the ratio (Z/Y) and the ratio (X/Y) is 1.0 or more.

<11> The internal part for a lighting tool for a vehicle according to any one of the above-mentioned items <1> to <10>, wherein the resin composition contains at least one resin selected from the group consisting of: a polymethyl methacrylate-based resin; a polystyrene-based resin; an acrylonitrile-styrene copolymer; a polycarbonate-based resin; a polymethylpentene-based resin; and a polyethylene terephthalate-based resin.

<12> A lighting tool for a vehicle, comprising:

an outer lens; and an inner lens, wherein the inner lens is the internal part for a lighting tool for a vehicle of any one of the above-mentioned items <1> to <11>.

<13> The lighting tool for a vehicle according to the above-mentioned item <12>, wherein the lighting tool for a vehicle further comprises a light source, and a distance between the entering portion of the internal part for a lighting tool for a vehicle and the light source is 5 mm or less.

<14> A method of producing the internal part for a lighting tool for a vehicle of any one of the above-mentioned items <1> to <11>, comprising a step of subjecting the resin composition to injection molding.

<15> The method of producing an internal part for a lighting tool for a vehicle according to the above-mentioned item <14>, wherein the step comprises subjecting the resin composition to injection molding under conditions of a cylinder temperature of 220° C. or more and 300° C. or less, and a retention time of seconds or more and 2,000 seconds or less.

Advantageous Effects of Invention

The internal part for a lighting tool for a vehicle of the present invention itself is excellent in initial color tone of guided light, and the internal part is suppressed from showing a change in color tone thereof in a long light-guiding path. The lighting tool for a vehicle having applied thereto the part is useful as a lighting tool for a DRL because the lighting tool can light up so that emitted light near its light-entering portion and emitted light at its light-guiding terminal portion may have uniform brightness.

DESCRIPTION OF EMBODIMENTS

An upper limit value and a lower limit value described herein for a numerical range may be arbitrarily combined.

In addition, two or more embodiments that are not contrary to each other out of the individual embodiments of an aspect according to the present invention to be described below may be combined, and an embodiment in which the two or more embodiments are combined is also an embodiment of the aspect according to the present invention.

[Internal Part for Lighting Tool for Vehicle]

An internal part for a lighting tool for a vehicle of the present invention is an internal part for a lighting tool for a vehicle, including; an entering portion from which light enters; an emitting portion from which the entered light is emitted; and a light-guiding portion configured to guide the light that has entered from the entering portion to the emitting portion, the part being arranged at a distance of 5 mm or less from a light source. In addition, the internal part for a lighting tool for a vehicle of the present invention is a molded body formed of a resin composition, a 5-millimeter thick plate, which is obtained by subjecting the resin composition to injection molding under conditions of a cylinder temperature of 260° C., a die temperature of 80° C., a cycle time of 50 seconds, and a retention time of 230 seconds, has a total light transmittance of 80% or more, and a ratio (X/Y) of a spectral light transmittance (X) of the 5-millimeter thick plate at a wavelength of 350 nm to a spectral light transmittance (Y) thereof at a wavelength of 400 nm is 0.75 or more. In general, light is absorbed by the skeleton of a resin or an additive, and is scattered by impurities, and hence transmitted light is attenuated. The degree of the attenuation at this time varies depending on the wavelength of the light, and becomes larger in proportion to a light-guiding distance. As a result, the attenuation is small in the entire wavelength region near a light source, and hence white LED light appears to be white. Meanwhile, the attenuation of short-wavelength light is large at an emitted light portion (light-guiding terminal portion) after a light guide, and hence the light appears to be yellow. That is, a change in color of light is small in a small shape or a short light-guiding path, but when a part is an elongated shape or has a long light-guiding path, scattering or absorption may have a large influence to enlarge a change in color tone thereof at the light-guiding terminal portion. Accordingly, in the case where the output of a light source such as an LED is increased to increase the quantity of entered light, even when the light is attenuated to some extent by its scattering or absorption in a light-guiding path, the quantity of the light reaching up to the light-guiding terminal portion increases in the end, and hence a change in color tone thereof can be reduced.

According to the present invention, even when the output of a light source such as an LED is small, the change of light at a light-guiding terminal portion can be reduced, and hence a change in color tone thereof in a long light-guiding path can be suppressed. When the output of the light source is small, the temperature of the internal part for a lighting tool for a vehicle hardly increases, and hence the deterioration thereof due to heat can be suppressed. Accordingly, a change in color tone of the part can be further suppressed. The use of a light source having a small output can lengthen the lifetime of the part serving as a member. According to the present invention, a light source having an output of preferably from 10 lm to 1,000 lm may be used as the light source such as an LED, and the use of such light source can suppress a change in color tone of the part in the long light-guiding path over a long time period. A light source having an output of from 20 lm to 500 lm is more preferably used from the viewpoint of suppressing a change in color tone of the internal part for a lighting tool for a vehicle over a long time period.

Although the reason why the internal part for a lighting tool for a vehicle of the present invention can suppress a change in color tone of light in a long light-guiding path is unclear, the reason is conceived to be as described below.

The change in color tone in the long light-guiding path may depend on the spectral light transmittance of the light-guiding molded body of a long light-guiding path part near 400 nm, and when the transmittance of the portion is excellent, it may be possible to reduce a difference in guided light color tone between entered light and emitted light in the long light-guiding path. The internal part for a lighting tool for a vehicle of the present invention is the molded body formed of the resin composition. The application of the following resin composition as the resin composition may be able to reduce the difference in guided light color tone between the entered light of the long light-guiding path part and the emitted light in the long light-guiding path: the ratio (X/Y) of the spectral light transmittance (X) of a 5-millimeter thick plate obtained by subjecting the resin composition to injection molding at a wavelength of 350 nm to the spectral light transmittance (Y) thereof at a wavelength of 400 nm is 0.75 or more.

The internal part for a lighting tool for a vehicle of the present invention is an internal part for a lighting tool for a vehicle, including: an entering portion from which light enters; an emitting portion from which the entered light is emitted; and a light-guiding portion configured to guide the light that has entered from the entering portion to the emitting portion, the part being arranged at a distance of 5 mm or less from a light source.

The entering portion is the starting end surface of the internal part for a lighting tool for a vehicle, and the arrangement of a light source having a predetermined wavelength region near the portion causes light from the light source to enter the light-guiding portion from the starting end surface. The light-guiding portion includes the optical path for guiding the entered light from the entering portion to the emitting portion in order to propagate the entered light in the light-guiding portion and to emit the light from the emitting portion. The emitting portion has a function of controlling the propagation direction of the light, which has been caused to enter from the entering portion and has propagated in the optical path, to emit the light to the outside of the light-guiding path of the internal part. The light that has been caused to enter the entering portion from the light source can be extracted from the emitting portion of a structure shaped on the surface of the internal part for a lighting tool for a vehicle. Although the shape of the emitting portion is not particularly limited, the shape may be, for example, a lattice-like pattern, a diamond lattice pattern, a stripe pattern, a comma-shaped bead pattern, a cloisonne pattern, a dot-like pattern, a wavy pattern, a broken line pattern, or a geometric pattern.

A distance between the entering portion of the internal part for a lighting tool for a vehicle and the light source is 5 mm or less, preferably 4 mm or less, more preferably 3 mm or less. From the viewpoint of reducing the difference in color tone between the entered light and the emitted light, the distance between the entering portion of the internal part for a lighting tool for a vehicle and the light source is preferably as close as possible.

The internal part for a lighting tool for a vehicle of the present invention is intended to suppress a change in color tone of light in a long light-guiding path, and a light-guiding path length from the entering portion to the emitting portion is preferably 100 mm or more, more preferably 200 mm or more, still more preferably 500 mm or more, still further more preferably 700 mm or more, still further more preferably 1,000 mm or more. The upper limit of the length may be, for example, 2,000 mm or less.

From the viewpoint of guiding the entered light from the entering portion to the emitting portion while suppressing its attenuation to the extent possible, the arithmetic average roughness Sa of the surface of the light-guiding portion is preferably 5.5 μm or less, more preferably 3 μm or less, still more preferably 1 μm or less, still further more preferably 0.5 μm or less, still further more preferably 0.1 μm or less. The Sa is preferably as small as possible, and hence its lower limit is not particularly limited. However, the Sa is, for example, 0.001 μm or more, and may be 0.01 μm or more or 0.02 μm or more. The "surface of the light-guiding portion" is not the emitting portion. The surface of the light-guiding portion is preferably produced by injection molding with a die subjected to mirror finish. The mirror finish is preferably performed by polishing the surface of the die with, for example, a polishing agent having a grain size of 1,000 meshes or more.

Although the light source to be used in the internal part for a lighting tool for a vehicle of the present invention is not particularly limited, for example, electroluminescence light, organic electroluminescence, or a light-emitting diode may be used. The number of the light sources is not particularly limited, and at least one light source may be used. In addition, the light from the light source may be white light, or may be chromatic light.

The internal part for a lighting tool for a vehicle of the present invention is the molded body formed of the resin composition. The internal part includes the resin composition, and hence can be molded into various shapes.

(Resin Composition)

Although the resin composition is not particularly limited as long as the composition can transmit light, the composition preferably contains at least one resin selected from the group consisting of: a polymethyl methacrylate-based resin; a polystyrene-based resin; an acrylonitrile-styrene copolymer; a polycarbonate-based resin; a polymethylpentene-based resin; and a polyethylene terephthalate-based resin, and the composition more preferably contains the polycarbonate-based resin from the viewpoint of excellent light transmittance.

Among the polycarbonate-based resins, an aromatic polycarbonate resin is preferred from the viewpoint of excellent light transmittance. A resin produced by a known method may be used as the aromatic polycarbonate resin without any particular limitation.

For example, a resin produced by causing a dihydric phenol and a carbonate precursor to react with each other by a solution method (interfacial polycondensation method) or a melting method (ester exchange method), i.e., a resin produced by the interfacial polycondensation method involving causing the dihydric phenol and phosgene to react with each other in the presence of an end terminator, or by causing the dihydric phenol and diphenyl carbonate or the like to react with each other in the presence of the end terminator according to the ester exchange method or the like may be used as the aromatic polycarbonate resin.

Examples of the dihydric phenol may include various dihydric phenols, in particular: bis(hydroxyphenyl)alkane-based compounds, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. In addition, the examples may also include hydroquinone, resorcin, and catechol. Those dihydric phenols may be used alone or in combination thereof.

Among them, one or more kinds of bis(hydroxyphenyl) alkane-based compounds selected from the group consisting of 2,2-bis(4-hydroxyphenyl)propane [bisphenol A], bis(4-hydroxyphenyl)methane, and 1,1-bis(4-hydroxyphenyl)ethane are preferred, and bisphenol A is particularly suitable.

Examples of the carbonate precursor include a carbonyl halide, a carbonyl ester, and a haloformate. The carbonate precursor is specifically phosgene, a dihaloformate of a dihydric phenol, diphenyl carbonate, dimethyl carbonate, diethyl carbonate, or the like.

The aromatic polycarbonate resin (A) may have a branched structure. As a branching agent used for introducing a branched structure, there are given, for example, 1,1,1-tris(4-hydroxyphenyl)ethane, α,α',α"-tris(4-hydroxyphenyl)-1,3,5-triisopropylbenzene, phloroglucin, trimellitic acid, and 1,3-bis(o-cresol).

A monovalent carboxylic acid or a derivative thereof or a monohydric phenol may be used as the end terminator. Examples thereof may include p-tert-butylphenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, and 1,1,1,3,3,3-hexafluoro-2-propanol.

It is preferred that the aromatic polycarbonate resin be a polycarbonate resin including, in a main chain thereof, a repeating unit represented by the following formula (I):

(I)

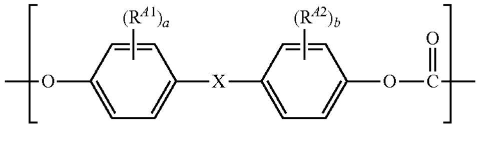

wherein $R^{A1}$ and $R^{A2}$ each represent an alkyl group or alkoxy group having 1 or more and 6 or less carbon atoms, and $R^{A1}$ and $R^{A2}$ may be identical to or different from each other, X represents a single bond, an alkylene group having 1 or more and 8 or less carbon atoms, an alkylidene group having 2 or more and 8 or less carbon atoms, a cycloalkylene group having 5 or more and 15 or less carbon atoms, a cycloalkylidene group having 5 or more and 15 or less carbon atoms, —S—, —SO—, —$SO_2$—, —O—, or —CO—, and "a" and "b" each independently represent an integer of 0 or more and 4 or less, when "a" represents 2 or more, $R^{A1}$s may be identical to or different from each other, and when "b" represents 2 or more, $R^{A2}$s may be identical to or different from each other.

Examples of the alkyl group represented by each of $R^{A1}$ and $R^{A2}$ include a methyl group, an ethyl group, a n-propyl group, an isopropyl group, various butyl groups (the term "various" means that a linear group and various branched groups are included, and the same holds true for the following), various pentyl groups, and various hexyl groups. An example of the alkoxy group represented by each of $R^{A1}$ and $R^{A2}$ is an alkoxy group whose alkyl group moiety is the alkyl group described above.

$R^{A1}$ and $R^{A2}$ each preferably represent an alkyl group having 1 or more and 4 or less carbon atoms or an alkoxy group having 1 or more and 4 or less carbon atoms.

Examples of the alkylene group represented by X include a methylene group, an ethylene group, a trimethylene group, a tetramethylene group, and a hexamethylene group. Among them, an alkylene group having 1 or more and 5 or less carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 or more and 10 or less carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 or more and 10 or less carbon atoms is preferred, and a cycloalkylidene group having 5 or more and 8 or less carbon atoms is more preferred.

"a" and "b" each independently represent an integer of 0 or more and 4 or less, preferably 0 or more and 2 or less, more preferably 0 or 1.

The aromatic polycarbonate resin preferably contains a polycarbonate resin having a bisphenol A structure from the viewpoints of, for example, the transparency, mechanical characteristics, and thermal characteristics of a molded body to be obtained. The polycarbonate resin having a bisphenol A structure is specifically, for example, such a resin that X in the formula (I) represents an isopropylidene group. The content of the polycarbonate resin having a bisphenol A structure in the aromatic polycarbonate resin is preferably 50 mass % or more and 100 mass % or less, more preferably 75 mass % or more and 100 mass % or less, still more preferably 85 mass % or more and 100 mass % or less.

From the viewpoint of flowability for molding into various shapes, the viscosity-average molecular weight (Mv) of the resin in the resin composition is preferably 10,000 or more, more preferably 11,000 or more, still more preferably 12,000 or more, and is preferably 30,000 or less, more preferably 25,000 or less, still more preferably 22,000 or less.

The viscosity-average molecular weight (Mv) as used herein is calculated from the following equation after the determination of a limiting viscosity [η] through the measurement of the viscosity of a methylene chloride solution at with an Ubbelohde-type viscometer.

$$[\eta]=1.23\times10^{-5}\,Mv^{0.83}$$

The content of the resin in the resin composition is preferably 50 mass % or more, more preferably 70 mass % or more, still more preferably 85 mass % or more, still further more preferably 95 mass % or more, still further more preferably 98 mass % or more from the viewpoint that the effects of the present invention are obtained. In addition, the upper limit of the content is preferably 99.995 mass % or less.

The resin composition may include an optional additive in addition to the resin. An example of the additive is an antioxidant.

(Antioxidant)

The resin composition preferably includes an antioxidant from the viewpoint of preventing its coloring and the like due to the oxidative deterioration of the resin. For example, a phosphorus-based antioxidant and/or a phenol-based antioxidant is suitably used as the antioxidant.

The phosphorus-based antioxidant is preferably a phosphite-based antioxidant or a phosphine-based antioxidant from the viewpoint of obtaining a resin composition that can be suppressed from causing discoloration and the like even when retained at high temperature.

Examples of the phosphite-based antioxidant include trisnonylphenyl phosphite, triphenyl phosphite, tridecyl phosphite, trioctadecyl phosphite, tris(2,4-di-tert-butylphenyl) phosphite (e.g., product available under the product name "Irgafos 168" from BASF SE or product available under the product name "ADK STAB 2112" from ADEKA Corporation), bis-(2,4-di-tert-butylphenyl)pentaerythritol-diphosphite (e.g., product available under the product name "Irgafos 126" from BASF SE or product available under the product name "ADK STAB PEP-24G" from ADEKA Corporation), bis-(2,4-di-tert-butyl-6-methylphenyl)ethyl phosphite (e.g., product available under the product name "Irgafos 38" from BASF SE), bis-(2,6-di-tert-butyl-4-methylphenyl)pentaerythritol-diphosphite (e.g., product available under the product name "ADK STAB PEP-36" from ADEKA Corporation), distearyl-pentaerythritol-diphosphite (e.g., product available under the product name "ADK STAB PEP-8" from ADEKA Corporation or product available under the product name "JPP-2000" from Johoku Chemical Co., Ltd.), [bis(2,4-di-tert-butyl- (e.g., product available under the product name "GSY-P101" from Osaki Industry Co., Ltd.), 2-tert-butyl-6-methyl-4-[3-(2,4,8,10-tetra-tert-butylbenzo[d][1,3,2]benzodioxaphosphepin-6-yl) oxypropyl]phenol (e.g., product available under the product name "Sumilizer GP" from Sumitomo Chemical Company, Limited), tris[2-[[2,4,8,10-tetra-tert-butyldibenzo[d,f][1,3,2]dioxaphosphepin-6-yl]oxy]ethyl]amine (e.g., product available under the product name "Irgafos 12" from BASF SE), and bis(2,4-dicumylphenyl)pentaerythritol diphosphite (product available under the product name "Doverphos S-9228PC" from Dover Chemical Corporation).

Among those phosphite-based antioxidants, tris(2,4-di-tert-butylphenyl) phosphite ("Irgafos 168"), bis(2,6-di-tert-butyl-4-methylphenyl)pentaerythritol-diphosphite ("ADK STAB PEP-36"), bis(2,4-di-tert-butylphenyl)pentaerythritol-diphosphite, bis(2,4-dicumylphenyl)pentaerythritol diphosphite ("Doverphos S-9228PC"), and 2-tert-butyl-6-methyl-4-[3-(2,4,8,10-tetra-tert-butylbenzo[d][1,3,2]benzodioxaphosphepin-6-yl)oxypropyl]phenol (e.g., product available under the product name "Sumilizer GP" from Sumitomo Chemical Company, Limited) are preferred from the viewpoint of preventing the coloring and the like of the resin composition. Among them, bis(2,6-di-tert-butyl-4-methylphenyl)pentaerythritol-diphosphite ("ADK STAB PEP-36") is particularly preferred.

An example of the phosphine-based antioxidant is triphenylphosphine (product available under the product name "JC263" from Johoku Chemical Co., Ltd.).

Examples of the phenol-based antioxidant include hindered phenols, such as n-octadecyl-3-(3,5-di-tert-butyl-4-hydroxyphenyl) propionate, 2,6-di-tert-butyl-4-methylphenol, 2,2'-methylenebis(4-methyl-6-tert-butylphenol), and pentaerythrityl-tetrakis [3-(3,5-di-tert-butyl-4-hydroxyphenyl)propionate]. Examples of commercially available products of the phenol-based antioxidant may include products available under the product names "Irganox 1010", "Irganox 1076", "Irganox 1330", "Irganox 3114", and "Irganox 3125" from BASF SE, a product available under the product name "BHT" from Takeda Pharmaceutical Company Limited, a product available under the product name "Cyanox 1790" from Cyanamid, and a product available under the product name "Sumilizer GA-80" from Sumitomo Chemical Company, Limited.

From the viewpoint of preventing the coloring and the like of the resin composition, the content of the antioxidant in the resin composition is preferably part by mass or more, more preferably 0.01 part by mass or more, still more preferably 0.02 part by mass or more with respect to 100 parts by mass of the resin, and is preferably 0.5 part by mass or less, more preferably 0.2 part by mass or less, still more preferably 0.1 part by mass or less, still further more preferably 0.05 part by mass or less, still further more preferably 0.04 part by mass or less with respect thereto.

(Method of Producing Resin Composition)

A method of producing the resin composition is not particularly limited, and the resin composition may be produced by mixing the resin and an additive to be added as required, and melting and kneading the mixture. The melting and kneading may be performed by a typically used method, for example, a method including using a single-screw extruder, a twin-screw extruder, a co-kneader, a multiple-screw extruder, or the like. In normal cases, a heating temperature at the time of the melting and kneading is appropriately selected from the range of from 220° C. to 300° C.

(Physical Properties of Resin Composition)

From the viewpoint of suppressing a change in color tone of guided light in the long light-guiding path of an internal part for a lighting tool for a vehicle, the total light transmittance of a 5-millimeter thick plate obtained by subjecting the resin composition to injection molding is 80% or more, preferably 85% or more, more preferably 88% or more, still more preferably 90% or more, still further more preferably 90.20% or more. The total light transmittance is preferably as high as possible, and hence its upper limit is not particularly limited. However, the total light transmittance is, for example, 100% or less, and may be 98% or less or 95% or less. The total light transmittance is measured in conformity with JIS K7361-1:1997.

From the viewpoint of suppressing the change in color tone of the guided light in the long light-guiding path of the internal part for the lighting tool for a vehicle, the YI of the 5-millimeter thick plate obtained by subjecting the resin composition to injection molding is preferably 1.5 or less, more preferably 1.3 or less, still more preferably 1.2 or less, still further more preferably 1.15 or less, still further more preferably 1.0 or less. The YI is preferably as low as possible, and hence its lower limit is not particularly limited. However, the YI is, for example, 0.1 or more, and may be 0.5 or more or 0.8 or more. The YI is measured by a method described in Examples to be described later.

In the present invention, the ratio (X/Y) of the spectral light transmittance (X) of the 5-millimeter thick plate obtained by subjecting the resin composition to injection molding at a wavelength of 350 nm to the spectral light transmittance (Y) thereof at a wavelength of 400 nm is 0.75 or more. The application of a resin composition having a ratio X/Y of 0.75 or more as the resin composition for forming the internal part for a lighting tool for a vehicle of the present invention can reduce the difference in guided light color tone between the entered light of the long light-guiding path part and the emitted light in the long light-guiding path. From the viewpoint of suppressing a change in color tone of light in the long light-guiding path of the internal part for a lighting tool for a vehicle, the ratio X/Y is preferably 0.80 or more, more preferably 0.85 or more, still more preferably 0.90 or more. The ratio X/Y is preferably as large as possible, and hence its upper limit is not particularly limited. However, the ratio X/Y is, for example, 1.00 or less, and may be 0.98 or less or 0.96 or less.

From the viewpoint of suppressing the change in color tone in the long light-guiding path of the internal part for a lighting tool for a vehicle, the spectral light transmittance (X) of the 5-millimeter thick plate obtained by subjecting the resin composition to injection molding at a wavelength of 350 nm is preferably 70% or more, more preferably 75% or more, still more preferably 80% or more. The spectral light transmittance (X) is preferably as high as possible, and hence its upper limit is not particularly limited. However, the spectral light transmittance is, for example, 100% or less, and may be 95% or less, 90% or less, or 85% or less.

From the viewpoint of suppressing the change in color tone in the long light-guiding path of the internal part for a lighting tool for a vehicle, the spectral light transmittance (Y) of the 5-millimeter thick plate obtained by subjecting the resin composition to injection molding at a wavelength of 400 nm is preferably 85% or more, more preferably 86% or more, still more preferably 87% or more, still further more preferably 88% or more. The spectral light transmittance (Y) is preferably as high as possible, and hence its upper limit is not particularly limited. However, the spectral light transmittance is, for example, 100% or less, may be 98% or less, 95% or less, or 92% or less.

From the viewpoint of suppressing the change in color tone in the long light-guiding path of the internal part for the lighting tool for a vehicle, the spectral light transmittance (Z) of the 5-millimeter thick plate obtained by subjecting the resin composition to injection molding at a wavelength of 300 nm is preferably 15% or more, more preferably 20% or more, still more preferably 25% or more, still further more preferably 30% or more. The spectral light transmittance (Z) is preferably as high as possible, and hence its upper limit is not particularly limited. However, the spectral light transmittance is, for example, 100% or less, and may be 80% or less, 60% or less, or 40% or less.

From the viewpoint of suppressing the change in color tone in the long light-guiding path of the internal part for a lighting tool for a vehicle, the ratio (Z/Y) of the spectral light transmittance (Z) of the 5-millimeter thick plate obtained by subjecting the resin composition to injection molding at a wavelength of 300 nm to the spectral light transmittance (Y) thereof at a wavelength of 400 nm is preferably 0.20 or more, more preferably 0.25 or more, still more preferably or more. The ratio Z/Y is preferably as large as possible, and hence its upper limit is not particularly limited. However, the ratio Z/Y is, for example, 1.00 or less, and may be 0.80 or less, 0.60 or less, or 0.45 or less.

From the viewpoint of suppressing the change in color tone in the long light-guiding path of the internal part for a lighting tool for a vehicle, the sum of the ratio (Z/Y) and the ratio (X/Y) is preferably 1.0 or more, more preferably 1.1 or more, still more preferably 1.2 or more. The sum of the ratio (Z/Y) and the ratio (X/Y) is preferably as large as possible, and hence its upper limit is not particularly limited. However, the sum is, for example, 2.0 or less, and may be 1.8 or less, 1.6 or less, or 1.4 or less.

The 5-millimeter thick plate obtained by subjecting the resin composition to injection molding, the plate satisfying the above-mentioned physical properties, is produced under the conditions of a cylinder temperature of 260° C., a die temperature of 80° C., a cycle time of 50 seconds, and a retention time of 230 seconds. Specifically, the 5-millimeter thick plate is obtained by a method described in Examples to be described later.

(Method of Producing Internal Part for Lighting Tool for Vehicle)

A method of producing the internal part for a lighting tool for a vehicle is not particularly limited, and the internal part for a lighting tool for a vehicle may be obtained by subjecting the resin composition to injection molding.

The internal part for a lighting tool for a vehicle may be produced through use of a melt-kneaded product of the resin composition or a pellet thereof obtained through melting and kneading as a raw material by an injection molding method, an injection compression molding method, an extrusion molding method, a blow molding method, a press molding method, a vacuum molding method, an expansion molding method, or the like. In particular, the molded body is preferably produced through use of the resultant pellet by an injection molding method or an injection compression molding method. A method of producing the resin molded body is preferably a method including a step of subjecting the resin composition including the aromatic polycarbonate resin to injection molding under the conditions of a cylinder temperature of 220° C. or more and 300° C. or less, and a retention time of 60 seconds or more and 2,000 seconds or less.

With regard to injection molding conditions, the cylinder temperature is preferably 300° C. or less, more preferably 290° C. or less, still more preferably 280° C. or less, and is preferably 220° C. or more, more preferably 230° C. or more. In addition, a die temperature is preferably 70° C. or more and 140° C. or less.

From the viewpoints of the optical characteristics of the molded body, a cycle time is preferably 300 seconds or less, more preferably 200 seconds or less, still more preferably 150 seconds or less, still further more preferably 120 seconds or less, still further more preferably 100 seconds or less. In addition, the shortening of the cycle time can shorten a time period required for the molding, and hence improves the productivity of the molded body. However, when the cycle time is excessively short, sufficient cooling is not performed up to the inside of the molded body, and hence the surface of the molded body is liable to roughen. Accordingly, from the viewpoint of obtaining a satisfactory surface roughness of the molded body, the cycle time is preferably 10 seconds or more, more preferably 20 seconds or more, still more preferably 30 seconds or more, still further more preferably 40 seconds or more. The adoption of termination molding to be described later can make the cycle time shorter than those described above.

From the viewpoints of the optical characteristics of the molded body, the retention time is preferably 2,000 seconds or less, more preferably 1,500 seconds or less, still more preferably 1,000 seconds or less, still further more preferably 500 seconds or less. In addition, from the viewpoint of obtaining a satisfactory surface roughness of the molded body, the retention time is preferably 60 seconds or more, more preferably 100 seconds or more.

In general, the injection molding includes a step of plasticizing and metering a raw material resin, an injecting step, a cooling step, and a product-removing step, and these steps are repeated as one cycle. A time period required for the one cycle is referred to as "cycle time." To obtain excellent optical characteristics, the shortening of the injecting step and the cooling step is required. A time period required for cooling becomes longer in proportion to the square of a product wall thickness, and hence the shortening of the cooling step is difficult in a thick-walled molded article. In view of the foregoing, the shortening of the injecting step becomes important. The inventors have made extensive investigations, and as a result, have found that so-called termination molding is preferably performed for the shortening of the injecting step. The injecting step includes a filling step and a pressure-holding step. In the termination molding, high-speed filling is performed for shortening the time period of the filling step, and the time period of the pressure-holding step is shortened by eliminating screw movement at the time of the pressure-holding step to hasten the start of gate sealing. Specifically, the termination molding is a molding method in which even when an actual shot amount varies to some extent, such setting as described below is not performed: a molten resin amount (so-called cushion amount) that should serve as a margin for absorbing the variation in shot amount is added to the amount of a molten resin to be originally injected. When such termination molding is performed, defective phenomena, such as a sink mark and air bubbles, can be reduced particularly at the time of the molding of a part having a thick-walled complicated shape. Although the reason why the termination molding can reduce the defective phenomena is unclear, possible factors for the reduction are, for example, as follows: even at the time of the completion of a holding time, a residual pressure is observed, and hence a molded article is in close contact with a die surface; and a gate pressure reduces in the pressure-holding step, but does not completely reduce to 0 MPa, and hence the backflow of the resin is suppressed.

In this description, the retention time is calculated from the following equation:

retention time=maximum injection volume (cc)/volume of one shot (cc)×2×molding period (second(s))=maximum metered value (mm)/[metered value (mm)−cushion amount (mm)]×2×molding period (second(s))

wherein the molding period represents the cycle time. The actual number 2 in the equation is a value calculated by using an actual molding machine.

Performance in the internal part for a lighting tool for a vehicle of the present invention may be evaluated by performing colorimetry with a light-guiding molded body for optical characteristic measurement formed of the resin composition. The light-guiding molded body includes the entering portion from which light enters, the emitting portion from which the entered light is emitted, and the light-guiding portion configured to guide the light that has entered from the entering portion to the emitting portion, and the light-guiding portion includes the optical path having such a curvature that the entered light is totally reflected.

The entering portion is the starting end surface of the light-guiding molded body, and the arrangement of a light source having a predetermined wavelength region near the portion causes light from the light source to enter the light-guiding portion from the starting end surface. The light-guiding portion includes the optical path for guiding the entered light from the entering portion to the emitting portion in order to propagate the entered light in the light-guiding portion and to emit the light from the emitting portion. The emitting portion has a function of controlling the propagation direction of the light, which has been caused to enter from the entering portion and has propagated in the optical path, to emit the light to the outside of the light-guiding path of the molded body. The light caused to enter the entering portion from the light source is extracted from the emitting portion (prism) of a structure shaped on the surface of the molded body for optical characteristic measurement. The shape of the emitting portion is set to a stripe pattern (prism shape).

In the light-guiding molded body, a light-guiding path length from the entering portion to the emitting portion at a light-guiding terminal needs to be at least 525 mm, at least two emitted light portions are arranged on the path from the entering portion to the emitting portion at the light-guiding terminal, and "y" values in the CIE 1931 color system are measured at at least positions distant from the entering portion by 125 mm and 525 mm. Thus, a change in color tone can be evaluated.

Reference may be made to the description of JP 2016-090229 A for the light-guiding molded body for optical characteristic measurement.

When the colorimetry is performed by using the light-guiding molded body for optical characteristic measurement and by using the white light-emitting diode as the light source, the difference (Y2−Y1) between the y(Y1) of the light-guiding molded body in the CIE 1931 color system at the position of the light-guiding path distant from the entering portion by 125 mm and the y(Y2) thereof in the CIE 1931 color system at the position of the light-guiding path distant from the entering portion by 525 mm is preferably 0.06 or less, more preferably 0.05 or less, still more preferably 0.045 or less, still further more preferably 0.042 or less, still further more preferably 0.040 or less from the viewpoint of suppressing a change in color tone of guided light in the long light-guiding path of an internal part for a lighting tool for a vehicle. The difference (Y2−Y1) is preferably as small as possible, and hence its lower limit is not particularly limited. However, the difference is, for example, 0 or more, and may be 0.001 or more, 0.010 or more, 0.020 or more, or 0.030 or more.

When the colorimetry is performed by using the light-guiding molded body for optical characteristic measurement and by using the white light-emitting diode as the light source, the y(Y2) of the light-guiding molded body in the CIE 1931 color system at the position of the light-guiding path distant from the entering portion by 525 mm is preferably 0.45 or less, more preferably 0.43 or less, still more preferably 0.42 or less, still further more preferably 0.41 or less, still further more preferably 0.40 or less from the viewpoint of suppressing a change in color tone of guided light in the long light-guiding path of an internal part for a lighting tool for a vehicle. The y(Y2) is preferably as small as possible, and hence its lower limit is not particularly limited. However, the y(Y2) is, for example, 0 or more, and may be 0.01 or more, 0.10 or more, 0.20 or more, or 0.30 or more.

In addition, when the colorimetry is performed by using the light-guiding molded body for optical characteristic measurement after being held at 120° C. for 1,000 hours and by using the white light-emitting diode as the light source, the difference (Y2'−Y1') between the y(Y1') of the light-guiding molded body in the CIE 1931 color system at the position of the light-guiding path distant from the entering portion by 125 mm and the y(Y2') thereof in the CIE 1931 color system at the position of the light-guiding path distant from the entering portion by 525 mm is preferably 0.090 or less, more preferably 0.085 or less, still more preferably 0.080 or less, still further more preferably 0.075 or less, still further more preferably 0.060 or less, still further more preferably 0.045 or less from the viewpoint of suppressing a change in color tone of guided light in the long light-guiding path of an internal part for a lighting tool for a vehicle. The difference (Y2'−Y1') is preferably as small as possible, and hence its lower limit is not particularly limited. However, the difference is, for example, 0 or more, and may be 0.001 or more, 0.010 or more, 0.020 or more, or 0.30 or more.

When the colorimetry is performed by using the light-guiding molded body for optical characteristic measurement and by using the white light-emitting diode as the light source, the difference (L1−L2) between the luminance L2 of the light-guiding molded body at the position of the light-guiding path distant from the entering portion by 525 mm and the luminance L1 thereof at the position of the light-guiding path distant from the entering portion by 125 mm is preferably 2,900 cd/$m^2$ or less, more preferably 2,700 cd/$m^2$ or less, still more preferably 2,600 cd/$m^2$ or less, still further more preferably 2,500 cd/$m^2$ or less from the viewpoint of suppressing a change in color tone of guided light in the long light-guiding path of an internal part for a lighting tool for a vehicle. The difference (L1−L2) is preferably as small as possible, and hence its lower limit is not particularly limited. However, the difference is, for example, 0 cd/$m^2$ or more, and may be 100 cd/$m^2$ or more, 500 cd/$m^2$ or more, or 1,000 cd/$m^2$ or more.

[Lighting Tool for Vehicle]

A lighting tool for a vehicle of the present invention includes the internal part for a lighting tool for a vehicle of the present invention. For example, a lighting tool for a vehicle, including an outer lens and an inner lens, wherein the inner lens is the internal part for a lighting tool for a vehicle of the present invention is preferred. In addition, the lighting tool for a vehicle is preferably at least one selected from the group consisting of: a front lamp for a vehicle; a back lamp for a vehicle; a communication lamp for a vehicle exterior; and a light for a vehicle interior (ambient lamp). The lighting tool for a vehicle of the present invention is useful as a lighting tool for a DRL because the lighting tool can light up so that emitted light near its light-entering portion and emitted light at its light-guiding terminal portion may have uniform brightness.

In addition, the lighting tool for a vehicle of the present invention further includes a light source, and a distance between the entering portion of the internal part for a lighting tool for a vehicle and the light source is 5 mm or less, preferably 4 mm or less, more preferably 3 mm or less. From the viewpoint of reducing a difference in color tone between entered light and emitted light, the distance between the entering portion of the internal part for a lighting tool for a vehicle and the light source is preferably as close as possible. The light source is, for example, a light-emitting element such as an LED.

EXAMPLES

The present invention is more specifically described below by way of Examples, but the present invention is not limited to these Examples.

Components used in Examples and Comparative Examples are as described below.

Aromatic polycarbonate resin (a): "TARFLON FN1500" (manufactured by Idemitsu Kosan Co., Ltd., viscosity-average molecular weight (Mv)=14,400)

Additive (b-1): "ADK STAB PEP-36" (manufactured by ADEKA Corporation, bis(2,6-di-tert-butyl-4-methylphenyl)pentaerythritol-diphosphite)

Additive (b-2): "ADK STAB 2112" (manufactured by ADEKA Corporation, tris(2,4-di-tert-butylphenyl) phosphite)

Additive (b-3): "ADK STAB PEP-8" (manufactured by ADEKA Corporation, distearyl-pentaerythritol-diphosphite)

Additive (b-4): "ADK STAB 3010" (manufactured by ADEKA Corporation, triisodecyl phosphite)

Production Examples 1 to 4

(Production of Resin Composition)

The respective components shown in each of Tables 1 and 2 were collectively mixed with a twin-screw extruder (manufactured by Toshiba Machine Co., Ltd., "TEM-2655", L/D=48, vented) while its cylinder temperature was set to 260° C. The resin kneaded product was supplied from the main throat portion of the extruder with a metering feeder, and was extruded into a strand shape under the conditions of an extrusion amount of 18 kg/hr and a screw revolution number of 180 rpm. The extrudate was rapidly cooled in a strand bath and cut with a strand cutter to provide a pellet-shaped resin composition.

TABLE 1

| | | | Production Example 1 | Production Example 2 | Production Example 3 | Production Example 4 |
|---|---|---|---|---|---|---|
| Resin | a | phr | 100 | 100 | 100 | 100 |
| Additive | b-1 | phr | 0.03 | | | |
| | b-2 | phr | | 0.03 | | |
| | b-3 | phr | | | 0.03 | |
| | b-4 | phr | | | | 0.03 |

TABLE 2

| | Name | Corporation |
|---|---|---|
| b-1 | ADK STAB PEP-36 | ADEKA Corporation |
| b-2 | ADK STAB 2112 | ADEKA Corporation |
| b-3 | ADK STAB PEP-8 | ADEKA Corporation |
| b-4 | ADK STAB 3010 | ADEKA Corporation |

Examples 1 to 7, and Comparative Examples 1 and 2

(Production of Molded Body 1 (5-Millimeter Thick Plate))

The pellet-shaped resin compositions obtained in Production Examples 1 to 4 were molded into 5-millimeter thick plate molded pieces (molded bodies 1-1 to 1-6) each measuring 50 mm by 90 mm by 5 mm thick with an injection molding machine (manufactured by Nissei Plastic Industrial Co., Ltd., “ES1000”: screw diameter: 26 mm). The resin pellet was dried at 120° C. for 5 hours immediately before the molding because the pellet could absorb moisture. Each test piece was molded under molding conditions A1 or B1 shown in Table 3.

TABLE 3

| | Temperature (° C.) | | Time (second(s)) | |
|---|---|---|---|---|
| | Cylinder | Die | Cycle | Retention |
| Molding conditions A1 | 260 | 80 | 50 | 230 |
| Molding conditions B1 | 270 | 80 | 260 | 1,040 |

(Production of Molded Body 2 (Light-Guiding Molded Body))

The pellet-shaped resin compositions obtained in Production Examples 1 to 4 were molded into Archimedean spiral-shaped light-guiding molded bodies for optical characteristic measurement (molded bodies 2-1 to 2-9) each measuring 10 mm wide by 3 mm thick by 1,100 mm long with an injection molding machine (manufactured by Niigata Machine Techno Co., Ltd., “MD350S7000”: screw diameter: 35 mm). The resin pellet was dried at 120° C. for 5 hours immediately before the molding because the pellet could absorb moisture.

In the production of a test piece A, a die whose surface had been subjected to mirror finish by being polished with a polishing agent having a grain size of 1,000 meshes was used as a die portion corresponding to the surface of a light-guiding portion (portion through which light in the molded body passed). In the production of a test piece B, a die whose portion corresponding to the surface of a light-guiding portion had been subjected to surface texturing was used.

The emitted light portions (125 mm and 525 mm) of the light-guiding molded body were subjected to die surface processing to have fine stripe patterns (prism shapes). Each test piece was molded under molding conditions A2 or B2 shown in Table 4, and each test piece was subjected to annealing treatment at 120° C. for 5 hours. Test piece shapes are shown in Table 5.

TABLE 4

| | Temperature (° C.) | | Time (second(s)) | |
|---|---|---|---|---|
| | Cylinder | Die | Cycle | Retention |
| Molding conditions A2 | 260 | 80 | 40 | 415 |
| Molding conditions B2 | 270 | 80 | 120 | 1,246 |

TABLE 5

| | Light-guiding portion | | Emitted light portion | | | |
|---|---|---|---|---|---|---|
| | Surface shape | Surface roughness (μm) | Surface shape | Surface roughness (μm) | Extraction position (mm) | |
| Test piece A | Mirror finish | Shown in Table 7 | Stripe pattern | 4 | 125 | 525 |
| Test piece B | Surface texturing | Shown in Table 7 | Stripe pattern | 4 | 125 | 525 |

[Evaluation]

(Total Light Transmittance of 5-Millimeter Thick Plate)

The total light transmittance of each of the resultant test pieces was measured in conformity with JIS K7361-1:1997 with a haze meter (manufactured by Suga Test Instruments Co., Ltd., model: “HGM-2DP”).

(Spectral Light Transmittances of 5-Millimeter Thick Plate)

The spectral light transmittances (%) of each of the resultant test pieces at wavelengths of 300 nm, 350 nm, and 400 nm were each measured with a spectrophotometer (manufactured by Hitachi High-Tech Corporation, “U-4100”).

(YI of 5-Millimeter Thick Plate)

Each of the resultant test pieces was measured for its yellow index (YI) value with “SZ-Σ90” manufactured by Nippon Denshoku Industries Co., Ltd. in conformity with JIS K7373:2006. A higher numerical value of the YI means that the test piece has a higher yellowness, and is hence colored to a larger extent.

(Arithmetic Average Surface Roughness Sa of Surface of Light-Guiding Portion of Light-Guiding Molded Body)

The light-guiding portion of each of the light-guiding molded bodies was subjected to measurement with the following apparatus.

The surface roughness (arithmetic average surface roughness Sa) of a surface at each of five sites (distant from an entered light portion by 110 mm, 210 mm, 310 mm, 410 mm, and 510 mm) per one test piece was measured in conformity with ISO 25178. In addition, the number average of the measured Sa’s at the five sites (i.e., the number “n” of times of the measurement was 5 for the test piece, and was 1 for each site) was calculated. The surface roughness Sa was measured with a confocal microscope (manufactured by Lasertec Corporation, “OPTELICS HYBRID”).

As the surface roughness of the test piece became lower, there was a tendency in that the quantity of light, which had passed through the inside of the resin thereof, to be scattered at an interface between the resin and air reduced, and hence a reduction in luminance of the light in the long light-guiding portion of the test piece was suppressed to a larger extent. In addition, the surface roughness of the surface of an emitted light portion of the test piece was similarly measured with the above-mentioned apparatus while the number “n” of times of the measurement was set to 1.

(Change in Color Tone of Light-Guiding Molded Body)

The light-guiding molded body was subjected to measurement with the following apparatus.

<Conditions for LED Light Irradiation>

A distance between the end portion of the test piece in the central portion of the light-guiding molded body and an LED was set to 2 mm, and an LED light source (Nichia Corporation, “NSFW036CT”) was used as the LED. The power consumption and irradiation intensity of the light source were set to 0.35 A×3.5 V and 23 lm, respectively, and light was applied from an end surface of the light-guiding molded body.

<Measurement of Color Tone of Guided Light>

The luminance and chromaticity of light emitted from the light-guiding molded body irradiated with the light under <Conditions for LED Light Irradiation> described above were measured with a spectral radiance meter (manufactured by Konica Minolta, Inc., "CS-2000"). The emitted light was extracted from each of positions distant from the light-entering portion of the light-guiding molded body by 125 mm and 525 mm, and was evaluated. The resultant values were represented in the CIE 1931 color system. In addition, emitted light having a larger Lv value was judged to be more excellent in luminance.

<Heat Resistance Test>

The light-guiding molded bodies were each held at 120° C. for 1,000 hours, and then the above-mentioned measurement of the color tone of guided light was performed.

TABLE 6

| | | | Pellet | | | | | |
|---|---|---|---|---|---|---|---|---|
| | | | Production Example 1 | Production Example 2 | Production Example 3 | Production Example 4 | Production Example 1 | Production Example 2 |
| | | | Molded body 1 | | | | | |
| | | | Molded body 1-1 | Molded body 1-2 | Molded body 1-3 | Molded body 1-4 | (Reference) Molded body 1-5 | (Reference) Molded body 1-6 |
| 5 mmt plate | Molding conditions | A1/B1 | A1 | A1 | A1 | A1 | B1 | B1 |
| | Total light transmittance | % | 90.24 | 90.22 | 90.18 | 90.12 | 90.23 | 90.23 |
| | Spectral light transmittance | 300 nm (Z) | 32.15 | 19.60 | 14.92 | 14.71 | 31.17 | 17.27 |
| | | 350 nm (X) | 83.67 | 73.09 | 64.59 | 61.38 | 82.53 | 69.34 |
| | | 400 nm (Y) | 88.83 | 88.36 | 87.15 | 86.53 | 87.83 | 85.17 |
| | | Ratio (X/Y) | 0.94 | 0.83 | 0.74 | 0.71 | 0.94 | 0.81 |
| | | Ratio (Z/Y) | 0.36 | 0.22 | 0.17 | 0.17 | 0.35 | 0.20 |
| | | Sum (X/Y) + (Z/Y) | 1.30 | 1.05 | 0.91 | 0.88 | 1.29 | 1.02 |
| | YI | [—] | 0.98 | 1.19 | 1.68 | 1.80 | 1.06 | 1.29 |

TABLE 7

| | | | | | Pellet | | | | | | | | |
|---|---|---|---|---|---|---|---|---|---|---|---|---|---|
| | | | | | Example 1 | Example 2 | Example 3 | Example 4 | Example 5 | Example 6 | Example 7 | Comparative Example 1 | Comparative Example 2 |
| | | | | | Production Example 1 | | | | Production Example 2 | | | Production Example 3 | Production Example 4 |
| | | | | | Molded body 2 | | | | | | | | |
| | | | | | Molded body 2-1 | Molded body 2-2 | Molded body 2-3 | Molded body 2-4 | Molded body 2-5 | Molded body 2-6 | Molded body 2-7 | Molded body 2-8 | Molded body 2-9 |
| Light-guiding molded body | Molding conditions | | | A2/B2 | A2 | B2 | A2 | B2 | A2 | B2 | B2 | A2 | A2 |
| | Test piece | | | A/B | A | A | B | B | A | A | B | A | A |
| | Sa of surface of light-guiding portion | | | [μm] | 0.03 | 0.04 | 4.2 | 5.3 | 0.03 | 0.06 | 4.2 | 0.03 | 0.03 |
| | Initial | 125 mm | Lv(L1) | [cd/m$^2$] | 6,075 | 6,045 | 5,915 | 5,843 | 6,176 | 6,075 | 6,007 | 5,870 | 5,596 |
| | | | y(Y1) | [—] | 0.3515 | 0.3682 | 0.3645 | 0.3745 | 0.3755 | 0.3932 | 0.3985 | 0.3852 | 0.3874 |
| | | 525 mm | Lv(L2) | [cd/m$^2$] | 3,594 | 3,488 | 3,378 | 3,265 | 3,322 | 3,206 | 3,125 | 2,751 | 2,656 |
| | | | y(Y2) | [—] | 0.3888 | 0.4073 | 0.4068 | 0.4184 | 0.4338 | 0.4624 | 0.4723 | 0.4530 | 0.4571 |
| | | (Y2-Y1) | | [—] | 0.0373 | 0.0391 | 0.0423 | 0.0439 | 0.0583 | 0.0692 | 0.0738 | 0.0678 | 0.0697 |
| | | (L1-L2) | | [cd/m$^2$] | 2,481 | 2,558 | 2,537 | 2,578 | 2,854 | 2,869 | 2,882 | 3,119 | 2,940 |
| | After heat resistance test | 125 mm | Lv(L1') | [cd/m$^2$] | 5,974 | 5,923 | 5,814 | 5,714 | 5,987 | 5,885 | 5,813 | 5,752 | 5,456 |
| | | | y(Y1') | [—] | 0.3621 | 0.3789 | 0.3742 | 0.3889 | 0.3997 | 0.4208 | 0.4287 | 0.4316 | 0.4458 |
| | | 525 mm | Lv(L2') | [cd/m$^2$] | 3,472 | 3,353 | 3,255 | 3,125 | 3,114 | 2,998 | 2,913 | 2,621 | 2,488 |
| | | | y(Y2') | [—] | 0.3993 | 0.4195 | 0.4162 | 0.4335 | 0.4708 | 0.5026 | 0.5162 | 0.5234 | 0.5395 |
| | | (Y2'-Y1') | | [—] | 0.0372 | 0.0406 | 0.0420 | 0.0446 | 0.0711 | 0.0818 | 0.0875 | 0.0918 | 0.0937 |
| | | (L1'-L2') | | [cd/m$^2$] | 2,502 | 2,570 | 2,559 | 2,589 | 2,873 | 2,887 | 2,900 | 3,131 | 2,968 |

As can be seen from the results of Table 6, the internal part for a lighting tool for a vehicle of the present invention itself is excellent in initial color tone of guided light because the ratio (X/Y) of the spectral light transmittance (X) of the thick plate at a wavelength of 350 nm to the spectral light transmittance (Y) thereof at a wavelength of 400 nm is 0.75 or more. In addition, the following facts can be seen from the results of Table 7: the value of the change (Y2−Y1) in color tone of the light-guiding molded body is low, and hence a change in color tone of light in the long light-guiding path is suppressed; and the value of the change (Y2'−Y1') in color tone of the light-guiding molded body after its heat resistance test is low, and hence the internal part for a lighting tool for a vehicle of the present invention is suppressed from causing a change in color tone of light in the long light-guiding path even when placed under a high-temperature environment for a long time period. Accordingly, the lighting tool for a vehicle having applied thereto the internal part for a lighting tool for a vehicle of the present invention is useful as a lighting tool for a DRL because the lighting tool can light up so that emitted light near its light-entering portion and emitted light at its light-guiding terminal portion may have uniform brightness.

The invention claimed is:

1. An internal part for a lighting tool for a vehicle, comprising:

an entering portion from which light enters;

an emitting portion from which the entered light is emitted; and a light-guiding portion configured to guide the light that has entered from the entering portion to the emitting portion, the internal part being arranged at a distance of 5 mm or less from a light source, wherein the internal part is a molded body formed of a resin composition, wherein a 5-millimeter thick plate, which is obtained by subjecting the resin composition to injection molding under conditions of a cylinder temperature of 260° C., a die temperature of 80° C., a cycle time of 50 seconds, and a retention time of 230 seconds, has a total light transmittance of 80% or more, and wherein a ratio (X/Y) of a spectral light transmittance (X) of the 5-millimeter thick plate at a wavelength of 350 nm to a spectral light transmittance (Y) thereof at a wavelength of 400 nm is 0.75 or more.

2. The internal part for a lighting tool for a vehicle according to claim 1, wherein a resin in the resin composition has a viscosity-average molecular weight of 10,000 or more and 30,000 or less.

3. The internal part for a lighting tool for a vehicle according to claim 1, wherein a light-guiding path length from the entering portion to the emitting portion is 100 mm or more.

4. The internal part for a lighting tool for a vehicle according to claim 1, wherein the lighting tool for a vehicle is at least one selected from the group consisting of: a front lamp for a vehicle; a back lamp for a vehicle; a communication lamp for a vehicle exterior; and an ambient light for a vehicle interior.

5. The internal part for a lighting tool for a vehicle according to claim 1, wherein a surface of the light-guiding portion has an arithmetic average roughness Sa of 3 μm or less.

6. The internal part for a lighting tool for a vehicle according to claim 1, wherein the 5-millimeter thick plate obtained by subjecting the resin composition to injection molding has a Yellow Index (YI) of 1.5 or less.

7. The internal part for a lighting tool for a vehicle according to claim 1, wherein the spectral light transmittance (X) of the 5-millimeter thick plate obtained by subjecting the resin composition to injection molding at a wavelength of 350 nm is 70% or more.

8. The internal part for a lighting tool for a vehicle according to claim 1, wherein a spectral light transmittance (Z) of the 5-millimeter thick plate obtained by subjecting the resin composition to injection molding at a wavelength of 300 nm is 15% or more.

9. The internal part for a lighting tool for a vehicle according to claim 8, wherein a ratio (Z/Y) of the spectral light transmittance (Z) of the 5-millimeter thick plate obtained by subjecting the resin composition to injection molding at a wavelength of 300 nm to the spectral light transmittance (Y) thereof at a wavelength of 400 nm is 0.20 or more.

10. The internal part for a lighting tool for a vehicle according to claim 9, wherein the spectral light transmittance (Y) of the 5-millimeter thick plate obtained by subjecting the resin composition to injection molding at a wavelength of 400 nm is 85% or more, and a sum of the ratio (Z/Y) and the ratio (X/Y) is 1.0 or more.

11. The internal part for a lighting tool for a vehicle according to claim 1, wherein the resin composition contains at least one resin selected from the group consisting of: a polymethyl methacrylate-based resin; a polystyrene-based resin; an acrylonitrile-styrene copolymer; a polycarbonate-based resin; a polymethylpentene-based resin; and a polyethylene terephthalate-based resin.

12. A lighting tool for a vehicle, comprising:

an outer lens; and an inner lens, wherein the inner lens is the internal part for a lighting tool for a vehicle of claim 1.

13. The lighting tool for a vehicle according to claim 12, wherein the lighting tool for a vehicle further comprises a light source, and a distance between the entering portion of the internal part for a lighting tool for a vehicle and the light source is 5 mm or less.

14. A method of producing the internal part for a lighting tool for a vehicle of claim 1, comprising a step of subjecting the resin composition to injection molding.

15. The method of producing an internal part for a lighting tool for a vehicle according to claim 14, wherein the step comprises subjecting the resin composition to injection molding under conditions of a cylinder temperature of 220° C. or more and 300° C. or less, and a retention time of 60 seconds or more and 2,000 seconds or less.

* * * * *